April 18, 1939.　　　　E. MARTIN　　　　2,154,987
SAW SET DEVICE
Filed Oct. 14, 1937
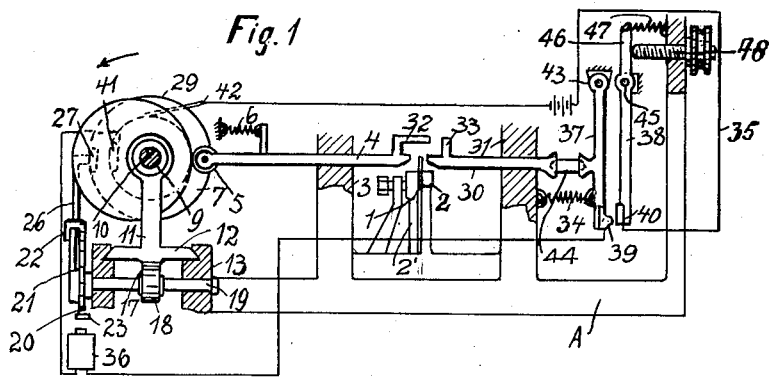
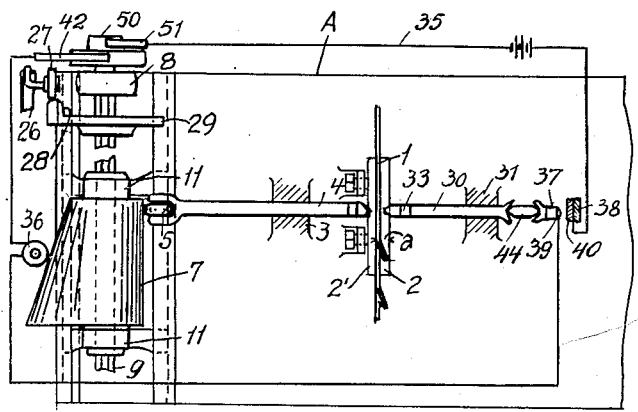
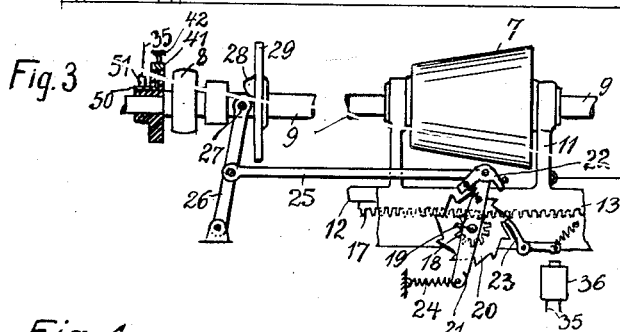
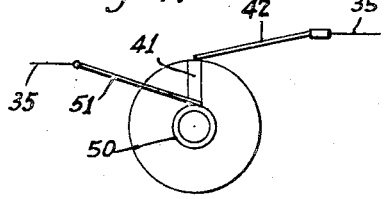
Inventor,
Frank S. Appleman, Erich Martin,
Attorney.

Patented Apr. 18, 1939

2,154,987

UNITED STATES PATENT OFFICE 2,154,987

SAW SET DEVICE

Erich Martin, Passau, Germany

Application October 14, 1937, Serial No. 169,031
In Germany October 14, 1936

5 Claims. (Cl. 76—66)

The invention relates to a saw-set device for setting the saw-teeth into their operative position.

The object of the invention is to provide a mechanism which greatly facilitates and makes accurate the operation for setting the saw without manual assistance.

Another object of the invention is to provide an apparatus in which the teeth of a saw are subjected to corrective action executed by an automatic controlling-mechanism.

The invention possesses other advantageous features, which, with the foregoing, will be set forth at length in the following description, where I shall disclose that form of the invention which I have selected for illustration in the drawing accompanying and forming part of the present invention.

The novelty of the invention will be included in the claims succeeding said description. From this it will be apparent that I do not limit myself to the showing made by such drawing and description, as I may adapt many variations within the scope of my invention as expressed in said claims.

Referring to the drawing: Fig. 1 is a side view of the saw-set device, partly in section. Fig. 2 is a plan view of said device, Fig. 3 is a side view of a detail of said device, and Fig. 4 is a plan view of a detail of said device.

The saw-set device of my invention is designed so that the blade of a saw 1 is always in positive connection with a gear moving the blade tooth by tooth in its longitudinal direction and holding the blade at the intervals of the movement in such position that a tooth becomes stationary in order to be set. The saw 1 is placed in the bed plate A of the machine and held in position by a vise comprising a jaw 2 fixed to said plate and a movable jaw 2' opposite said fixed jaw between which and the movable jaw the saw is held. A feeding mechanism serves for feeding the saw but it may be of known structure and is therefore not shown in the drawing and not claimed. The setter 4 is in positive connection with reciprocating means, by which the setter is reciprocated against one lateral face of a tooth of the saw-blade 1 resting with its other lateral face against the nut 2, which resists the shocks imparted to the tooth when the setter 4 is brought into violent contact with the tooth. This contact is repeated, until a shock executed on the tooth has succeeded to set the tooth in its desired definitive position. The setter 4, reciprocated by a cam 7, is provided with an antifriction roller 5 and is normally held in its operative position by suitable means, such as a spring 6 which aims to press the roller against the circumferential surface of the cam 7. This cam is shaped as a partly cylindrical and partly conical body which is rotated by a shaft 9 having a slot in which the cam slides by means of a feather attached to said cam. The shaft 9 is driven by a pulley 8 and is provided with a suitable bearing 11 which is mounted on a sliding carrier 12, which slides upon a guide 13. A weight 14 is connected with the bearing 11 by means of a sash-line 15 guided by a roller 16 and is adapted to retract the slide 12 into its initial position corresponding to the smallest cross-sectional portion of the cam and shown in Fig. 2. The slide 12 is connected with a rack 17 meshing with a pinion 18 mounted on the shaft 19 having attached thereto a ratchet wheel 20. Pivotally mounted on the shaft 19 is a tilting lever 21 to which dog 22 is pivotally secured and to which lever a terminal of a retracting spring 24 is attached. A pawl 23 is arranged for preventing the wheel 20 from rotating the shaft 19 in the wrong direction. A rod 25 connects the lever 21 with a pivotally mounted shifting arm 26 which is provided with an antifriction roller 27 engaging with a disc 29 having a cam-knob 28 which is adapted to actuate the pivotal arm 26 which in turn shifts the rod 25 by which the lever 21 is turned for operating the dog 22. The dog 22 operates on the ratchet wheel 20 for causing the cog wheel 18 to move the rack 17 one step. According to the stepping motion the support 11 carrying the cam 7 is shifted parallel to a parent line of the tapering surface of the cam for adjusting an ascending cam portion opposite the roller 5 and for imparting increased strokes to the setter 4 by means of said ascending cam portion at its single revolutions. The shifting motion of the cam 7 is continued, until the setter 4 has set the tooth of the saw to its desired accurate shape. By the setter 4 thus operated the point of the tooth is compelled to travel from its original position to a definite position spaced from the former at a distance a (Fig. 2). When the tooth has been set into its final accurate shape, the pawl 23 is released for unlocking the ratchet wheel 20. A means releasing the pawl 23 is provided for permitting the weight 14 to retract the support 11 to its original position, when the pawl 23 is released. To the pawl 23 an electromagnetic mechanism is associated for releasing said pawl when the saw tooth has been set to keep its permanent accurate shape. The mechanism is provided with a key 30 displaceably mounted at 31 and bearing with its point against the tooth 1 opposite the setter 4. The setter 4 is provided with a finger 32 which projects across the saw-blade 1. The key 30 is provided with a stud 33 and may be moved back by the finger 32 when it is pressed against the stud 33 against the action of a retracting spring 34. The releasing mechanism comprises an electrical circuit 35, an electromagnet 36 adapted to be excited by the circuit and two switches controlling said circuit. The one switch comprises two pivotal levers 37, 38. The lever 37 is pivoted at 43 and provided with a contact-piece 39. The other lever 38 is pivoted at 45 and provided with a contact-piece 40. The other switch comprises a contact-piece 41 segmental shaped and inserted in insulation material of a disc upon which a contact spring 42 slides. The contact-piece 41 is connected with a contact-ring 50 upon which a brush 51 slides which is connected with the circuit 35. The contact-piece 41 closes the contact with the contact-spring 42 at the moment, when the cam 7 retains the roller 5 near the terminal position of its backward movement. The contact between 41 and 42 closes the circuit 35 during a short time. This contact effects the closure of the circuit 35 only when the contact-pieces 39, 40 close their contact. In Fig. 1 an arrow designates the direction of the rotation of the shaft 9 and of the contact-piece 41.

The electromagnet 36, the contact pieces 39, 40, 41, 42 and an electrical current source are connected in series by the wire 35. The current energizing the electromagnet 36 raises, when not only the contact 39, 40, but also the second contact 41, 42 are closed. The lever 37 carrying the contact piece 39 is connected by a link 44 with the key 30 actuating said lever. An arm 46 of the lever 38 carrying the contact piece 40 is attached to a retracting spring 47. An adjusting screw 48 is arranged opposite said cam 46 and may be manipulated for adjusting the spring pressed lever 38 to its normal position. The tapering cam 7 rotated by the shaft 9 moves the spring pressed setter 4 against one side of a saw tooth and causes the finger 32 to depress the stud 33 for removing the key from the other side of said tooth which is to be deflected by the setter 4. The setter is retracted by its spring 6 after each stroke. Also the key 30 is retracted by its spring 34, but arrested by the tooth point. When the cam 7 completes its present revolution, the contact member 41 slides on the contact piece 42. But the circuit remains still open, if the tooth arresting the key does not fully assume its desired accurate shape. New shifting motions are forced to the support 11 by the stepping device the tappet 28 and disc 29 of which operate by means of the latch lever 21, 22 the ratchet and cog wheels 20, 18 displacing the rack 17 for situating a larger portion of the cam 7 to the roller 5 opposite the setter 4 than formerly. When the shaft 9 is further revolved, the next stroke of the setter 4 is increased by the tapering cam 7. The step of shifting motion is effected repeatedly after each revolution of the cam 7 by similar operation of the stepping device, until the key 30 is held by the tooth set to its final accurate shape. At this moment the levers 37, 38 are caused by the key 30 to move their contact pieces 39, 40 against another for closing the one complemental contact of the wire 35. By the shaft 9 continuing its present revolution the contact piece 41 is rotated to touch the contact piece 42 for closing the other complemental contact. While both contacts 39, 40, and 41, 42 are now closed, the electromagnet 36 is energized to release the pawl 23 for unlocking the ratchet wheel 20 thus permitting the action of the weight 14 retracting the support 11 and the cam 7 to its original position. By feeding the saw 1 another tooth is situated opposite the setter 4 for subjecting this tooth to a setting operation in such a manner disclosed above.

My invention is not to be understood as restricted to the construction illustrated and described, since this can be modified without departing from the spirit of the invention.

Having thus described the invention what I claim as new and desire to obtain by Letters Patent is:

1. In a saw setting device, means to support a saw, a reciprocating tooth setting element, a rotating shaft, a cam drum engaging said element slidably mounted thereon for axial movement and adapted to be rotated thereby, said drum having a circumferential portion that is cylindrical and a remaining portion which is a cam which progressively increases from one end to the opposite end of the drum, and means for longitudinally moving said cam drum whereby said reciprocating element is inactively quiescent in one position of the drum on the shaft and reciprocates in other positions of the drum on said shaft.

2. In a saw setting device, means to support a saw, a reciprocating tooth setting element, a rotating shaft, a cam drum engaging said element slidably mounted thereon for axial movement and adapted to be rotated thereby, said drum having a circumferential portion that is cylindrical and a remaining portion which is a cam which progressively increases from one end to the opposite end of the drum, means for longitudinally moving said cam drum whereby said reciprocating element is inactively quiescent in one position of the drum on the shaft and reciprocates in other positions of the drum on said shaft, a feeler key displaceably mounted opposite the saw setting element, a spring for holding said feeler key against the tooth operated upon by said element and on the opposite side thereof, and means actuated by the movement of the feeler key for moving the cam drum into inactive position upon setting of the tooth acted upon.

3. In a saw setting device, means to support a saw, a reciprocating tooth setting element, a rotating shaft, a cam drum engaging said element slidably mounted thereon for axial movement and adapted to be rotated thereby, said drum having a circumferential portion that is cylindrical and a remaining portion which is a cam which progressively increases from one end to the opposite end of the drum, means for longitudinally moving said cam drum whereby said reciprocating element is inactively quiescent in one position of the drum on the shaft and reciprocates in other positions of the drum on said shaft, a feeler key displaceably mounted opposite the saw setting element, a spring for holding said feeler key against the tooth operated upon by said element and on the opposite side thereof, and means actuated by the movement of the feeler key for moving the cam drum into inactive position upon setting of the tooth acted upon including locking means for securing the cam drum in longitudinally adjusted position, retracting means for moving said cam drum into inactive position, and releasing means operable by said feeler key for releasing said locking means from its drum securing position.

4. In a saw setting device, means to support a saw, a reciprocating tooth setting elment, a rotating shaft, a cam drum engaging said element slidably mounted thereon for axial movement and adapted to be rotated thereby, said drum having a circumferential portion that is cylindrical and a remaining portion which is a cam which progressively increases from one end to the opposite end of the drum, means for longitudinally moving said cam drum whereby said reciprocating element is inactively quiescent in one position of the drum on the shaft and reciprocates in other positions of the drum on said shaft, the means for longitudinally moving said cam including a rack, a pinion meshing with said rack, a shaft supporting said pinion, a ratchet wheel fixed on said shaft, a pawl cooperating with said ratchet to hold the same releasably against movement in one direction, a feeler key displaceably mounted opposite the saw setting element and spring pressed against the tooth operated upon by said element, and releasing means operable by movement of the feeler key for releasing said pawl from said ratchet.

5. In a saw setting device, means to support a saw, a reciprocating tooth setting element, a rotating shaft, a cam drum engaging said element, slidably mounted thereon for axial movement and adapted to be rotated thereby, said drum having a circumferential portion that is cylindrical and a remaining portion which is a cam which progressively increases from one end to the opposite end of the drum, means for longitudinally moving said cam drum whereby said reciprocating element is inactively quiescent in one position of the drum on the shaft and reciprocates in other positions of the drum on said shaft, the means for longitudinally moving said cam including a rack, a pinion meshing with said rack, a shaft supporting said pinion, a ratchet wheel fixed on said shaft, a pawl cooperating with said ratchet to hold the same releasably against movement in one direction, a feeler key displaceably mounted opposite the saw setting element and spring pressed against the tooth operated upon by said element, an electromagnet operating when energized to release said pawl from said ratchet wheel, and a normally open circuit including said electromagnet and including a circuit closer actuated to close the circuit upon maximum movement of the feeler key.

ERICH MARTIN.